United States Patent
Yoon

[11] 3,913,602
[45] Oct. 21, 1975

[54] HYDRANT WITH HEATING AND PURGING MEANS

[76] Inventor: Young Z. Yoon, 2930 E. Madison St., Des Moines, Iowa 50317

[22] Filed: June 13, 1973

[21] Appl. No.: 369,599

Related U.S. Application Data

[63] Continuation-in-part of Ser. No. 113,273, Feb. 8, 1971, abandoned.

[52] U.S. Cl. .................. 137/60; 137/297; 137/301; 137/341; 137/375; 219/200; 219/306; 222/146 HE
[51] Int. Cl.² .................. E03B 9/14; F16K 49/00
[58] Field of Search ........... 137/297, 301, 302, 341, 137/334, 60; 138/32, 33; 219/200, 201, 306, 308; 222/146 H, 146 HE; 251/117

[56] References Cited
UNITED STATES PATENTS

| | | | |
|---|---|---|---|
| 218,418 | 8/1879 | Baermann | 137/308 X |
| 382,951 | 5/1888 | Carroll | 137/340 X |
| 649,159 | 5/1900 | Carroll | 137/301 X |
| 724,742 | 4/1903 | Sandbo | 137/339 X |
| 1,277,197 | 8/1918 | Crandon et al. | 137/59 |
| 2,556,557 | 6/1951 | Schweitzer | 137/341 |
| 2,565,993 | 8/1951 | Schmid et al. | 137/341 X |
| 2,937,009 | 5/1960 | Anderson | 137/301 X |
| 3,566,905 | 3/1971 | Noland | 137/301 X |

*Primary Examiner*—Martin P. Schwadron
*Assistant Examiner*—Richard Gerard
*Attorney, Agent, or Firm*—Roy E. Petherbridge; Robert L. Lindgren; Edward D. Gilhooly

[57] ABSTRACT

A fluid connector apparatus or hydrant including an insulated casing enclosing a valve control element to supply water to a utilization station. A heating element is positioned within the fluid connector apparatus to prevent freezing of liquid therein. A fluid removal line is provided to remove accumulated water from within casing as required. The valve control element, the heating element and, in some applications, the fluid removal line are inserted in the casing in a manner facilitating ease of withdrawal of the elements for maintenance, servicing and replacement of the internal parts of the connector unit as required.

11 Claims, 10 Drawing Figures

INVENTOR.
YOUNG Z. YOON

INVENTOR
YOUNG Z. YOON
BY Petherbridge, O'Neill & Lindgren
ATTORNEYS.

INVENTOR
YOUNG Z. YOON
BY Petherbridge, O'Neill & Lindgren
ATTORNEYS

HYDRANT WITH HEATING AND PURGING MEANS

This is a continuation-in-part of copending application, Ser. No. 113,273 filed Feb. 8, 1971 entitled Fluid Connector Apparatus and since abandoned.

BACKGROUND OF THE INVENTION

This invention relates in general to water supply systems and in particular to a novel freezeless fluid connector apparatus.

More specifically, the invention relates to a fluid connector apparatus or hydrant which is readily connected to an underground fluid line to supply fluid to a desired station without freezing of the liquid being supplied. The fluid connector apparatus further includes means to remove fluid entrapped internally in the housing of the connector unit to an external point.

Generally, fluid lines such as water supply lines are situated beneath the surface of the ground and a fluid connector must provide fluid communication between the supply line and a utilization station, often an above ground structure. The connector must produce a controlled and sanitary flow of fluid from the supply line to the structure to which the line is connected. For example, the connector may supply water for personal consumption to a structure such as a mobile home or other dwelling.

When installed, conventional fluid connectors have presented several problems in achieving satisfactory fluid service to a utilization station. For example, freezing problems are encountered since the connector is exposed to various thermal conditions. If the fluid passing through the connector freezes, the frozen liquid prevents the passage of flow from the supply line and further can cause damage to the connector unit. Moreover, since the liquid passing through the connector may be used for personal consumption, it is necessary that the unit prevent contaminating seepage of liquid into the system from external sources.

In service, it is desirable to shut off flow of fluid through the connector from the supply line to the utilization station at certain periods. However, as the valve element of the connector is in "off" condition, water is stagnantly entrapped within the unit. If such water is not removed, the entrapped liquid is subject to freezing which can have adverse effect on the structure of the unit. Further, the water can corrode the housing and also become contaminated to hinder the passage of clean and safe liquid to the structure to which the connector apparatus is coupled. Also, after the connector has encountered a certain duration of use, it is sometimes necessary that maintenance or repair be performed on the unit to provide satisfactory and extended service. Since a connector is often positioned underground, it is advantageous that such repairs and maintenance be readily performed without requiring the removal of the unit from its connection with the underground fluid source.

In the prior art, several techniques have been employed in order to connect an above-ground structure to an underground liquid supply line. In order to prevent the freezing of the water within the water supply connector, heating elements have been employed to maintain a desired temperature within the casing. However, prior art devices require a relatively uneconomical amount of electrical power in order to achieve the desired prevention of freezing because the heating element is not advantageously positioned in the housing or the unit is not properly insulated.

There has also existed a deficiency in previous connector apparatus in effecting efficient maintenance and repair of the unit. To perform such service in the past, has required that the device be disconnected from the underground fluid source since the units did not include adequate provision for access to the interior of the casing in a connected position. Further, a problem has been encountered in the prior art in readily removing the internal parts thereof for repair or modification as desired.

Prior art connector units have also not provided an efficient technique for removing liquid from the unit, particularly at times when the valve element thereof is in an "off" position. As mentioned previously if the entrapped liquid is not removed, the unit may be subject to freezing or even become contaminated.

Another difficulty associated with some of the prior art methods of connecting a utilization station to a fluid line is that the connector did not allow the shutting off of flow therebetween at a point below the frost line. In such a case, the liquid on the supply line side of the valve element would obviously be undesirably exposed to freezing temperatures. Therefore, it is desirable to provide a readily maintained water connector apparatus which prevents freezing, allows ready access to internal parts and effectively accomplishes its intended function.

SUMMARY OF THE INVENTION

It is, therefore, an object of this invention to improve the connecting of a utilization station to a fluid supply line.

Another object of this invention is to prevent the freezing of fluid within a connector when exposed to low temperature conditions.

A further object of this invention is to facilitate the maintenance, repair and replacement of the internal elements of a water connector apparatus.

Still another object of this invention is to permit the removal of liquid from the casing of a connector apparatus as required.

A still further object of this invention is to insure the passage of uncontaminated fluid from an underground supply source to a utilization station.

These and other objects are attained in accordance with the present invention wherein there is provided a novel connector apparatus for connecting a utilization station with a submerged or underground fluid supply line. The connector apparatus of the invention is insulated from low thermal conditions by means of a fluid tight insulation housing and further includes heater means within the unit to maintain the interior at a temperature above freezing. The connector apparatus of the invention includes means to remove water from within the casing, when desired, to a location above ground with respect to the underground position of the connector. Thus, freezing and contamination of the liquid is prevented, while the valve element is in an "off" position or the heating element is not in an operating condition.

The present invention provides for ease of maintenance and repair of the apparatus by mounting the heating and fluid control elements in a manner to allow ease of removal thereof even when the unit is coupled to the underground source. By simply withdrawing the heater and/or control elements through the top of the apparatus, the internal elements can be repaired or modified. Further, the removal of the control and heater elements provides access to the interior of the connector to perform any desired service therein.

The connector apparatus herein disclosed includes a control element which maintains a controlled flow from the supply line to the utilization station. The control element of the apparatus is located at a position below the frost line and thus freezing of the fluid on the supply line side of the valve element is prevented when the flow is turned off even if the heating element is not operating. Accordingly, the present invention provides an inexpensive and highly effective fluid connector apparatus which overcomes freezing problems and insures flow of uncontaminated fluid from the fluid supply line.

DESCRIPTION OF THE DRAWINGS

Further objects of the invention, together with additional features contributing thereto and advantages accruing therefrom, will be apparent from the following description of several embodiments of the invention when read in conjunction with the accompanying drawings, wherein.

DESCRIPTION OF THE PREFERRED EMBODIMENT

Figure 1:
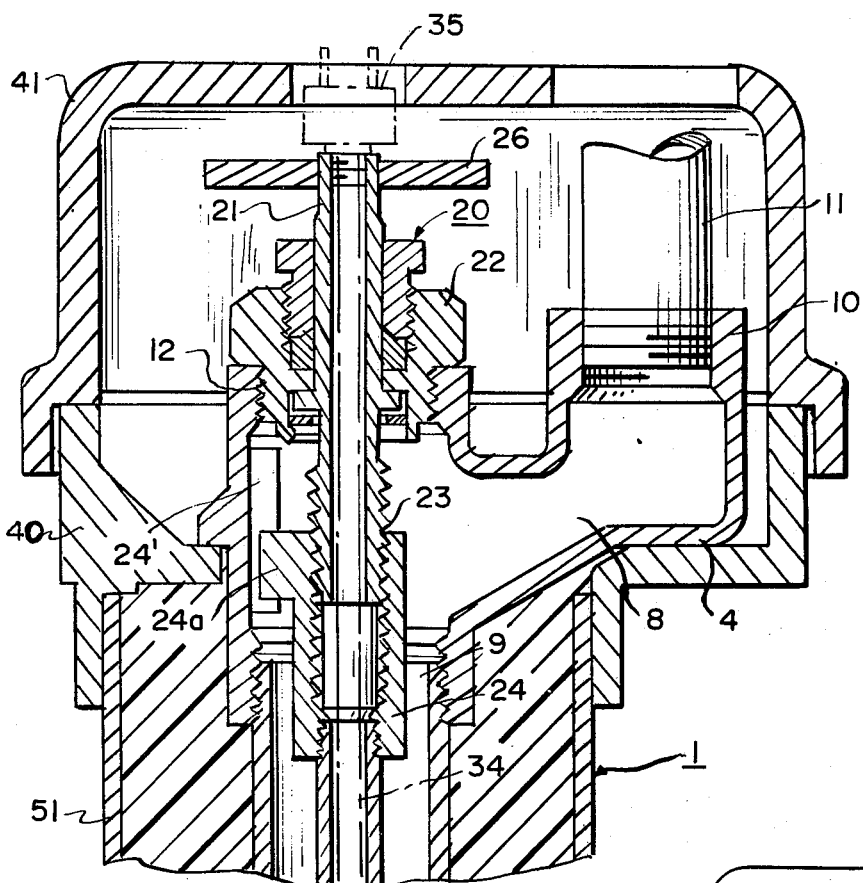
FIG. 1 is a schematic side illustration of one embodiment of the fluid connector apparatus of the invention.
Figure 2:
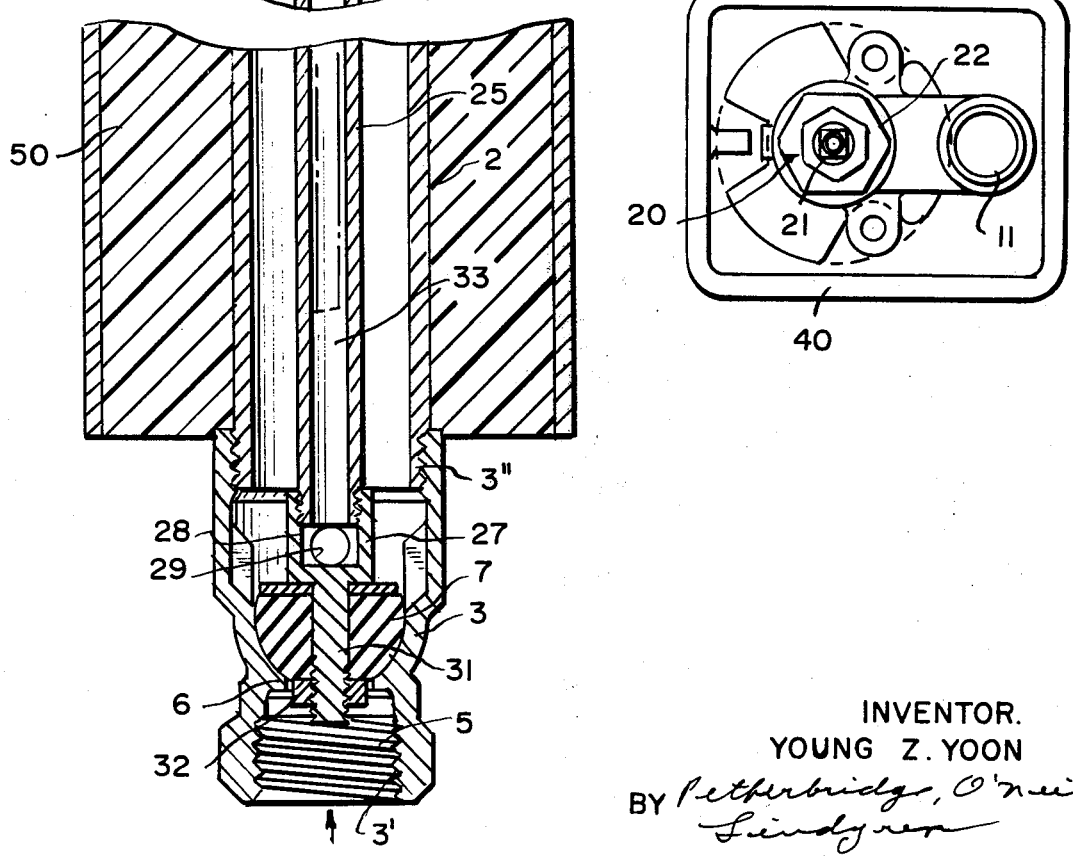
FIG. 2 is a schematic top illustration of the embodiment illustrated in FIG. 1.

Referring now to FIGS. 1 and 2, there is illustrated one embodiment of the improved water connector apparatus or hydrant of the present invention. The central element of the fluid connector apparatus 1 is a fluid conduit 2 which is made of any suitable material such as steel and the like. The fluid conduit 2 provides fluid communication between a fluid inlet fitting 3 and an upper fluid outlet fitting 4.

The fluid inlet fitting 3 includes attachment means 3' which allow the fitting to be attached to an inlet line connected to a fluid supply line (not shown). The attachment means 3' may be any conventional element such as internally disposed threads as shown in FIG. 1 or alternatively externally disposed threads or other common attaching elements. A flow passage 5 extends through fitting 3 whereby the body of the fitting is provided with a valve seat 6 which cooperates with a valve element 7 of the connector unit in a manner to be described in detail later. The upper end of the inlet fitting further includes connector means 3'' which allows the fitting to be attached to corresponding means on fluid conduit 2.

The upper outlet fitting 4 comprises an elbow-type member having a fluid passage 8 therethrough. The fitting 4 includes a bottom portion which creates an inlet 9 having formed with conventional attachment means which allows the fitting to be attached to corresponding attachment means on fluid conduit 2. Fitting 4 further includes an upper portion which forms an outlet opening 10 to which a pipe 11 is coupled to provide fluid communication to a utilization station, such as a mobile home. The pipe from the utilization station may be attached to the outlet of the fitting 4 in any conventional manner. Thus, it should be clear that a flow passage through fluid connector apparatus 1 is provided by inlet fitting 3, fluid conduit 2 and outlet fitting 4.

The upper outlet fitting 4 is provided with a second threaded opening 12 which is axially aligned with fluid conduit 2. Opening 12 is adapted to receive a fluid control assembly 20 which provides control of the flow of fluid passing through the connector as well as thermal control of the fluid. A control stem 21 of the fluid control assembly is supported within the opening 12 by conventional coupling elements 22 so that rotational movement of the stem is possible without any axial movement. Control stem 21 may be constructed of any suitable material, such as a metal or other material capable of supporting the control assembly of the invention.

The bottom end of the control stem 21 possesses an outer threaded surface 23 which is adapted to be coupled to an internally threaded sleeve 24 located within the connector apparatus 1. The bottom end of the sleeve 24 is connected to an elongated valve stem 25 which is attached to the internal threaded sleeve in a locked relationship. A key 24a projects from the body of sleeve 24 to contact a projection 24' of outlet fitting 4 and thus prevent rotation of the sleeve. Therefore, it should be apparent that rotation of the control stem 21 causes sleeve 24 and valve stem 25 to move axially in an upward or downward direction depending on the direction of rotation of the control stem. As shown in FIG. 1, the upper end of control stem 21 includes a conventional handle means 26 which facilitates the desired longitudinal movement of the valve stem 25 within the conduit 2.

The bottom end of valve stem 25 extends substantially through conduit 2 to the inlet fitting 3 and is adapted to retain support element 27 by means of conventional threads and the like. The upper portion 28 of support element 27 is in a cup-shaped configuration and includes internally disposed threads which interengage with external threads located on valve stem 25. The threaded end of the valve stem is only intended to be inserted partially into the upper cup-like portion 28 of the support element. A blow-out hole 29 is provided in the wall of the support element 27 to provide continuous fluid communication between the flow passage of conduit 2 adjacent the inlet fitting 3 and passage 33. Support element 27 further includes a solid projection 31 which is adapted to support conventional valve element 7. The valve element 7 is supported on the exterior surface of the extension of the support element and is secured thereto by means of a conventional nut 32 or other coupling means.

As clearly shown in FIG. 1, valve element 7 is positioned adjacent valve seat 6 in the inlet fitting so as to provide a flow controlling function of the fluid passing through the inlet fitting into the fluid connector 1. As illustrated in FIG. 1, the valve is shown in an "off" position and upon rotation of the control stem, as previously described, the valving element is movable upward from the valve seat to positions allowing a control of the flow of fluid passing through the connector apparatus to the utilization station.

Still referring to FIG. 1, control stem 21, hollow sleeve 24, and valve stem 25 are all hollow tubes providing the continuous flow passage 33 extending between blow-out hole 29 located in support element 27 and the upper end of control stem 21. This hollow passage 33 allows for the insertion of a heater element 34 through the upper end of the control stem 21. The heater element is attached to a heater element connector 35 which includes threads to allow the heater element to be attached to similar cooperating means existing on the upper end of the control stem. The heater connector element is adapted to be attached to an electrical line and a source of electrical power (not shown). The threaded connection between the upper end of control stem 21 and the heater connector element 35 provides a fluid-tight seal at the top of the passage created by the control stem and also allows the heater element and connector to be solely removed for repair or replacement if desired.

Heating element 34 may be of any desired length but in some instance it is extended into the flow passage provided through the fluid connector apparatus to a point below the level of the frost-line. The heater element may comprise any suitable type immersion heater element, such as a metal rod or the like, which supplies a sufficient amount of thermal energy to the connector to prevent freezing of the fluid within the fluid within the fluid connector. The internal central location of the heater element in the apparatus disclosed herein provides the required degree heat at a low cost since it is efficiently immersed centrally within the apparatus.

The outlet fitting 4 is supported within a rectangularly shaped housing 40. The housing 40 is adapted to cooperate with a cover element 40a which is placed over control stem 21 and the outlet 10 of the outlet fitting. The cover may be attached in a tamper-proof manner by any known technique of preventing undesired access to the fluid connector. The cover includes sufficient opening to allow the electrical connections to provide electrical energy to the heater element and further allow the insertion of a pipe 11 from the utilization station to the outlet 10 of the fluid connector.

As a further aid in the prevention of freezing of the unit and to provide a completely sealed unit, the fluid conduit 2 and the outlet fitting 4 is shown being molded in a water-proof thermally insulative material 50. The material used to surround the elements to prevent freezing and to provide insulation may be of any suitable material such as waterproof polyurethane foam. To lend strength and provide complete fluid sealing of the connector unit, the polyurethane insulation is covered by high strength outer casing 51 which may be plastic or other elements. Plastic is particularly desirable since it provides a corrosive-proof casing at a low cost.

Although not intended to be so limited, in normal use of the invention the fluid connector is intended to connect an underground fluid supply line to an above ground utilization station. The unit is designed to be located substantially in the ground except that fluid outlet 10 and fluid control assembly 20 are accessible at the ground surface. Therefore, it is desirable that the connector unit be of a sufficient length to allow the control valve element 7 be located at a position below the frost line in the ground. By such a location of the valve element, there is no danger of freezing of fluid on the supply line side of the unit when the valve element is in an "off" position. Accordingly, the need to extend adjacent valve heater element 34 is unnecessary, and thus the apparatus may be maintained in an "off" condition without danger of freezing the valve.

From the foregoing it should be apparent that the positioning of fluid control assembly 20 in opening 12 of the outlet fitting allows the ready removal of the entire assembly 20 including the heater element 34 and valve element 7. Such removal is possible since opening 12 is axially aligned with fluid conduit 2 in which the control assembly 20 is positioned. To withdraw the entire assembly, coupling 22 is removed from opening 12 after cover element 40a has been taken off and the entire assembly is removed. Thus any repair or service of the valve 7, heater element 34 or other internal elements of the control assembly can be effected. Moreover, after removal of the control assembly 20, the opening provides an effective access to interior of the outlet fitting 4, fluid conduit 2 and inlet fitting 3 to perform any desired service or maintenance to interior of the unit. Thus the external elements of the apparatus are readily accessible from the top of the unit without requiring the removal of the entire connector from its underground position.

At times when the valve element is cut off to discontinue flow through the unit, it should be apparent that some fluid remains in the apparatus above the valve element and is entrapped therein. The entrapped fluid is subject to freezing if heater element 34 is in a nonoperating state and may even contaminate or corrode the internal parts. Therefore, the fluid within the apparatus may be removed by one of two methods according to the present invention. After valve element 7 has been positioned in an "off" position, heater element 34 and heater element connector 35 are removed from the hollow passage 33 in control stem 21 and also pipe 11 coupled to outlet opening may be removed. Pressure supplied by a hand tire pump, or other suitable source of pressurized air, is introduced through outlet opening 10 to pressurize the interior of the unit. Since hollow passage 33 communicates with the interior of the fluid connector through hole 29, the pressurized air forced into outlet opening 10 forces accumulated fluid through the blow-out hole 29 and out through the continuous hollow passage 33 to exit at the top opening of control stem 21 at a position adjacent ground level. Thus, after removal of the water from conduit 2 through blow-out hole 29 and associated passage 33, the danger of contamination or freezing of the stagnant water is alleviated.

Figure 5:
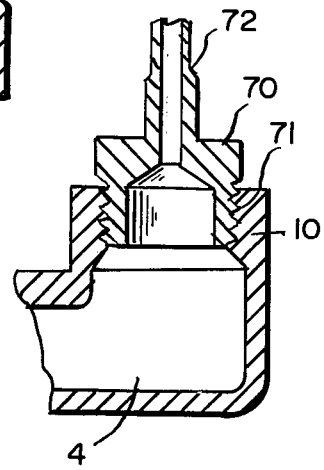
FIG. 5 is a sectional schematic illustration of an adapter for use in the fluid connector apparatus of the invention.

The adapter illustrated in FIG. 5 (to be described in detail later) may be utilized as an effective way of attaching a pressure source to outlet opening 10. Alternatively, the water entrapped within the housing may be removed by attaching a suction pump of any suitable type to the end of control stem 21 upon removal of the heating element and the water is pulled from the fluid connector unit to the suction pump to likewise drain the fluid out of the apparatus to a location above ground.

Figure 3:
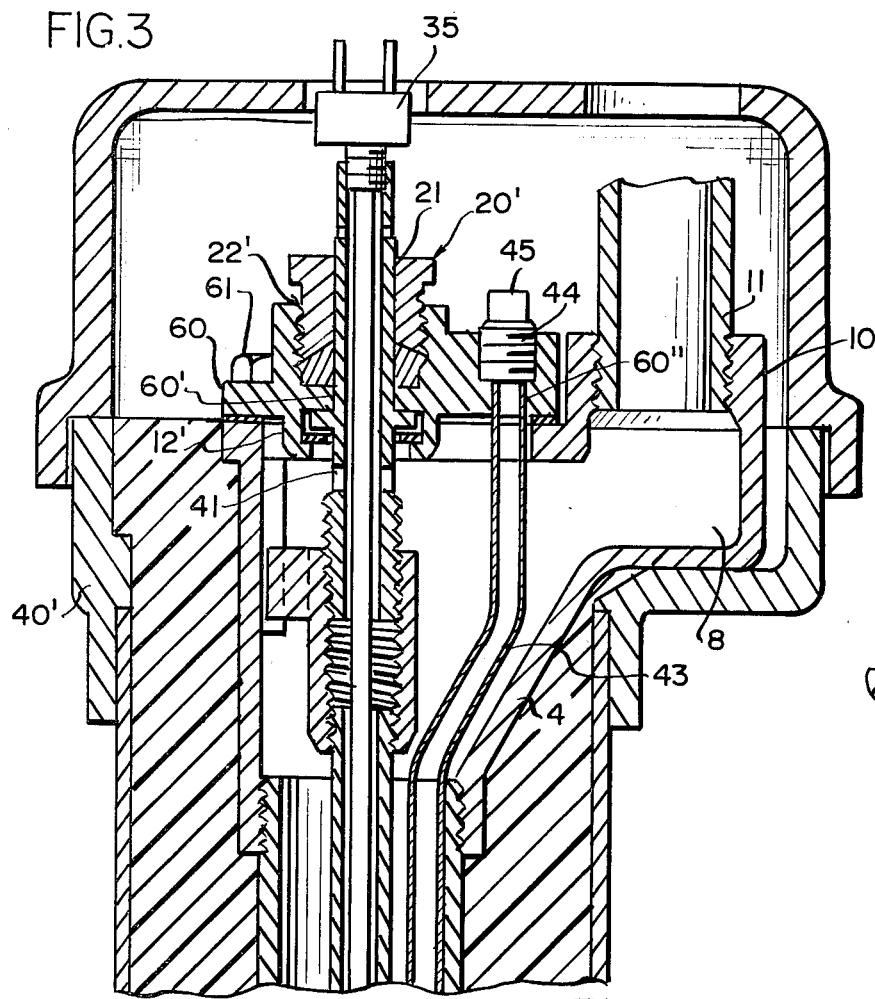
FIG. 3 is a side schematic illustration of another embodiment of the fluid connector apparatus of the present invention.
Figure 4:
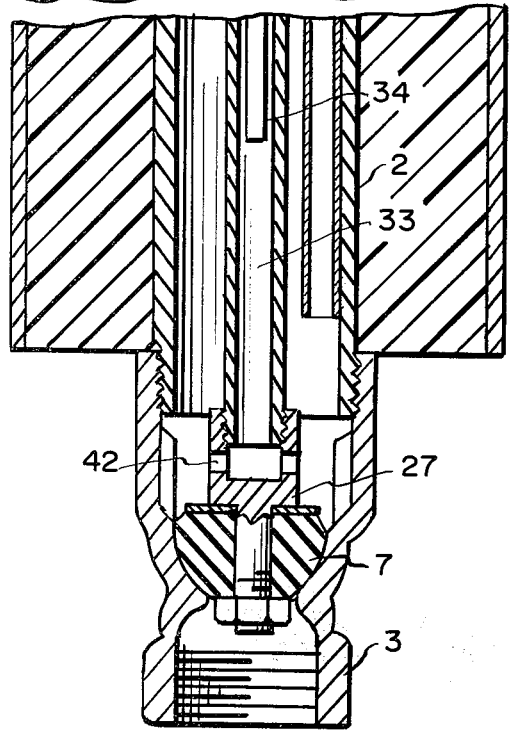
FIG. 4 is a schematic top illustration of the embodiment illustrated in FIG. 3.
Figure 4:
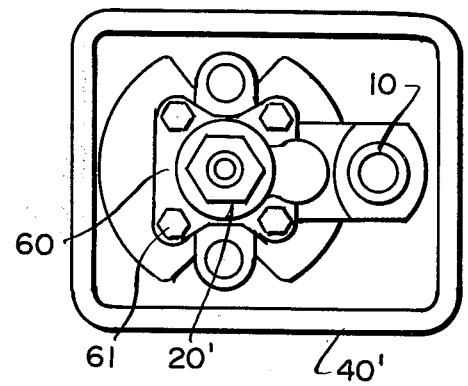

Referring now to FIG. 3, there is illustrated another embodiment of the connector apparatus or fluid hydrant of the present invention. The embodiment of FIG. 3 operates generally on the same principles as that illustrated in FIG. 1. The fluid connector or hydrant of FIGS. 3 and 4 is identical to the embodiment described in reference to FIG. 1 except that the fluid control assembly and mounting thereof is modified and a separate blow-out passage is provided to effect removal of accumulated fluid from within the housing. Fluid control assembly 20' is inserted into outlet fitting 4 and conduit 2 of the fluid connector and includes a valve element 7 which cooperates to control the flow therethrough in a manner previously described for the embodiment of FIG. 1. A heater 23 is also mounted by heater connector element 35 within hollow passage 33 provided within control assembly 20'.

One or more upper circulation openings 41 are formed in control stem 21 to effect fluid communication between the hollow passage 33 and the fluid passage 8 passing through outlet fitting 10. Similarly, two or more lower circulation openings 42 are provided in support element 27 which is coupled to the end of the fluid control assembly. Openings 42 provide fluid communication between the flow passing through inlet fitting 3 and conduit 2 of the connector unit and hollow passage 33 of control assembly 20'. Upper and lower openings 41 and 42 are utilized to provide a circulation of a portion of the fluid flowing through the connector through hollow passage 33 to achieve greater distribution of heat to the fluid within the fluid connector. Such greater heat distribution is achieved since some of the flow of fluid passing through the connector enters lower opening 42 flows upward through hollow passage 33 into the proximity of the heater 34 and then exits at upper opening 41. Although the flow circulating through hollow passage 33 is a small proportion of the flow passing through the connector, the circulating fluid being in direct contact with heater element 34 is efficiently heated and thus effectively distributes heat to the fluid passing through the connector after it exits from upper circulation openings 41.

Still referring to FIGS. 3 and 4, second opening 12' located at the top of outlet fitting 10 is enlarged in comparison to the previously described embodiment of FIG. 1 in order to receive both the modified fluid control assembly 20' and a separate blow-out passage element 43. Fluid blow-out passage element 43 comprises a hollow tube of any suitable material which extends through opening 12' into fluid conduit 2. The upper end of hollow blow-out tube 43 possesses a threaded member 44 which receives a cap 45 which is used to seal the passage when blow-out tube 43 is not being utilized for removal or purging of accumulated water. Both fluid control assembly 20' and blow-out tube 43 are mounted within a cover member 60 which is attached to outlet fitting 4 by means of bolts 61 best seen in FIG. 4. Four bolts are illustrated in FIG. 4, but it should be apparent that any number of bolts or other suitable attachment means may be utilized to secure the cover member into sealing engagement with outlet fitting 4.

Cover member 60 includes an upwardly facing opening 60' which is adapted to receive conventional coupling elements 22' which supports the control stem 21 in a manner similar as described with reference to FIG. 1. Further, cover element 60 includes an opening 60'' which is adapted to receive and support the threaded elements 44 of the blow-out tube 43. From the foregoing, it should be apparent that the fluid control assembly and the blow tube are readily removed for repair or modification from the connector by removing cover 60 from the outlet fitting. Upon removal of cover 60, opening 12' provides access to the interior of the connector for service even if the unit is in its underground position.

As described in FIG. 1, it is often desirable to remove fluid from within the water connector when valve element 7 is in an "off" operating position. To achieve such removal of fluid from within the connector in the embodiment of FIG. 3, blow-out tube 43 is utilized. The cover plug 45 is removed from its attached position from element 44 and the inlet pipe of the utilization station is uncoupled from opening 10 of the outlet fitting. Thereafter, a positive pressure is applied within the fluid connector which causes accumulated fluid to be blown out through hollow passage 43 to the surface to purge the connector. To achieve the efficient removal of the accumulated water from within the fluid connector 1, an adapter may be attached to the threaded opening 10 of the outlet fitting upon removal of the inlet pipe to the utilization station. Such an adapter may include a body 70 having outer disposed threads 71 which interengage with the inner threads of opening 10. A passage is provided through body 70 of the adapter and a hollow projection 72 is constructed on the body having a narrow diameter to receive the hose of a pressure supply means such as a hand tire pump or other suitable air pressure means. The adapter may also be utilized in conjunction with the embodiment of FIG. 1, as previously described.

The embodiment of FIG. 3 is particularly efficient in removing accumulated water from within the connector since the heater element does not have to be removed from the hollow passage 33 as in the previously described embodiment of FIG. 1. Further since opening 12 is enlarged in order to receive both blow-out tube 43 and fluid control assembly 20', removal of cover 60 and the associated elements thereof allows the ready access to the interior parts of the apparatus. As was the case in the embodiment of FIG. 1, heater element 34 may individually be removed from the end of the control stem 21 for maintenance and repair if desired.

Figure 6:
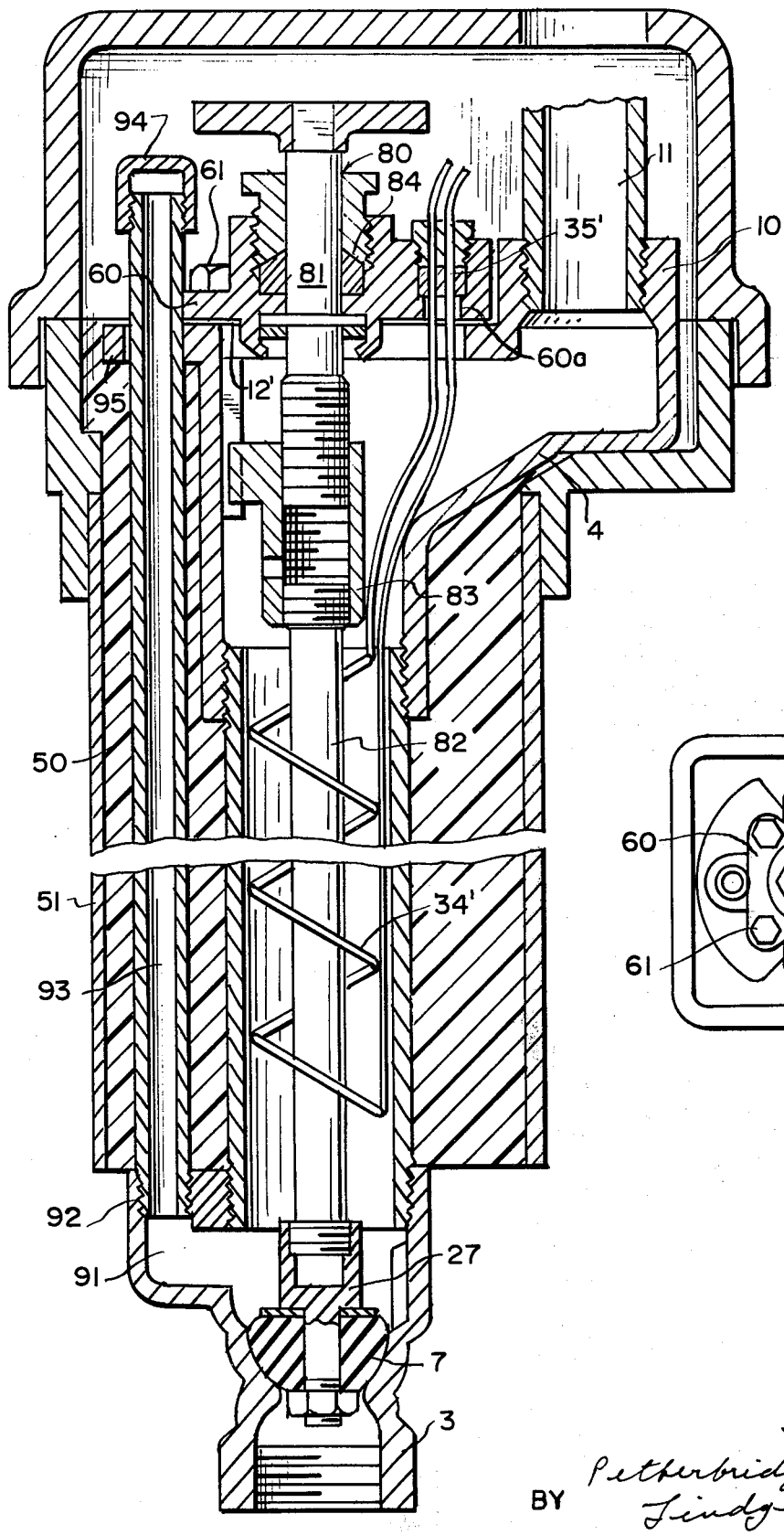
FIG. 6 is a side illustration of still another embodiment of the fluid connector apparatus of the invention.
Figure 7:
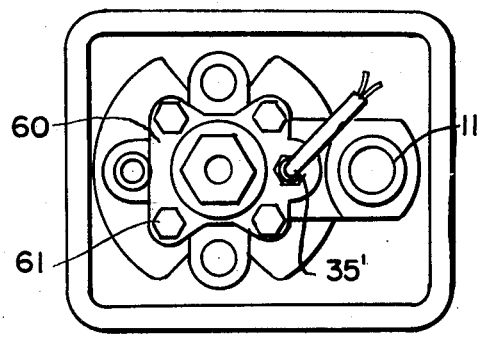
FIG. 7 is a top schematic illustration of the embodiment of FIG. 6.

Referring now to FIGS. 6 and 7, there is illustrated still another embodiment of the fluid connector or hydrant apparatus of the present invention. The embodiment of FIGS. 6 and 7 is similar in structure and in operation to the embodiment illustrated with reference to FIG. 1 except that the heating means, the valving means and the fluid removal means have been modified. Control valve assembly 80 of FIG. 6 includes an elongated solid control stem 81 and rod 85 instead of the hollow elements of the previous embodiments. Rotation of control stem 81 cooperates with sleeve 83 to effect movement of valve element 7 in a manner as previously described. Valve control assembly 80 is inserted into the apparatus through an opening 12" provided at the top of outlet fitting 4. Coupling members 82 rotatably supporting control stem 81 are positioned in sealing relationship in cover member 60 which is secured to the outlet fitting by means of bolts 61 or other suitable attachment means.

Cover member 60 is further provided with an opening 60a to receive the leads of a coil-type resistance element heater 34' which is positioned in surrounding relationship to rod 82. Heating element 34' may comprise any resistance type heater element constructed of a suitable material such as metal and is connected to a source of electrical potential (not shown). The electrical leads of the heater are supported within the opening of cover member 60 by means of a heater connector element 35' which includes threads which correspond to similar elements of opening 60a for securement therein. It should be apparent from the foregoing that removal of both the heater element and the control valve assembly may be achieved in FIG. 6 by removing the bolts 61 and then simultaneously removing the cover, heater, and valve assembly from the connector for repair and maintenance. After removing the foregoing elements, opening 12" at the top of the outlet fitting provides sufficient access to the interior of the fluid connector to maintain and repair the interior of the fluid connector without removal thereof from an underground position.

Still referring to FIG. 6, inlet fitting 3 of the fluid connector includes a secondary flow passage 91 which terminates at an opening 92 with internally disposed threads formed in the body of the inlet fitting. A blow-out tube 93 having external threads at both ends is attached to opening 92 and extends upward through a flange 95 provided on outlet fitting 4. Blow-out tube 93 passes through insulated material 50 within outer casing 51 of the connector. Attached to the upper end of the blow-out tube is a cover element 94 which may be attached thereto by means of threads or any other suitable attachment means. Therefore, in normal operating conditions of the fluid connector, blow-out tube 93 is sealed by means of cap 94 and thus normal operation of the connector may be effected. However if valve element 7 is positioned in an "off" position, fluid may be accumulated within the connector unit above element 7. In order to remove such accumulated water, cap 94 is removed and inlet pipe 11 to the utilization station is removed from the opening 10 of the outlet fitting. Thereafter, a positive pressure source as in the prior embodiments is applied through outlet 10 such as, for example, through the use of the adapter illustrated in FIG. 5. The pressure applied therethrough causes the fluid within the connector to be forced out blow-out tube 93 and to exit at the upper end thereof for collection or to be disposed of in any selected manner.

Figure 8:
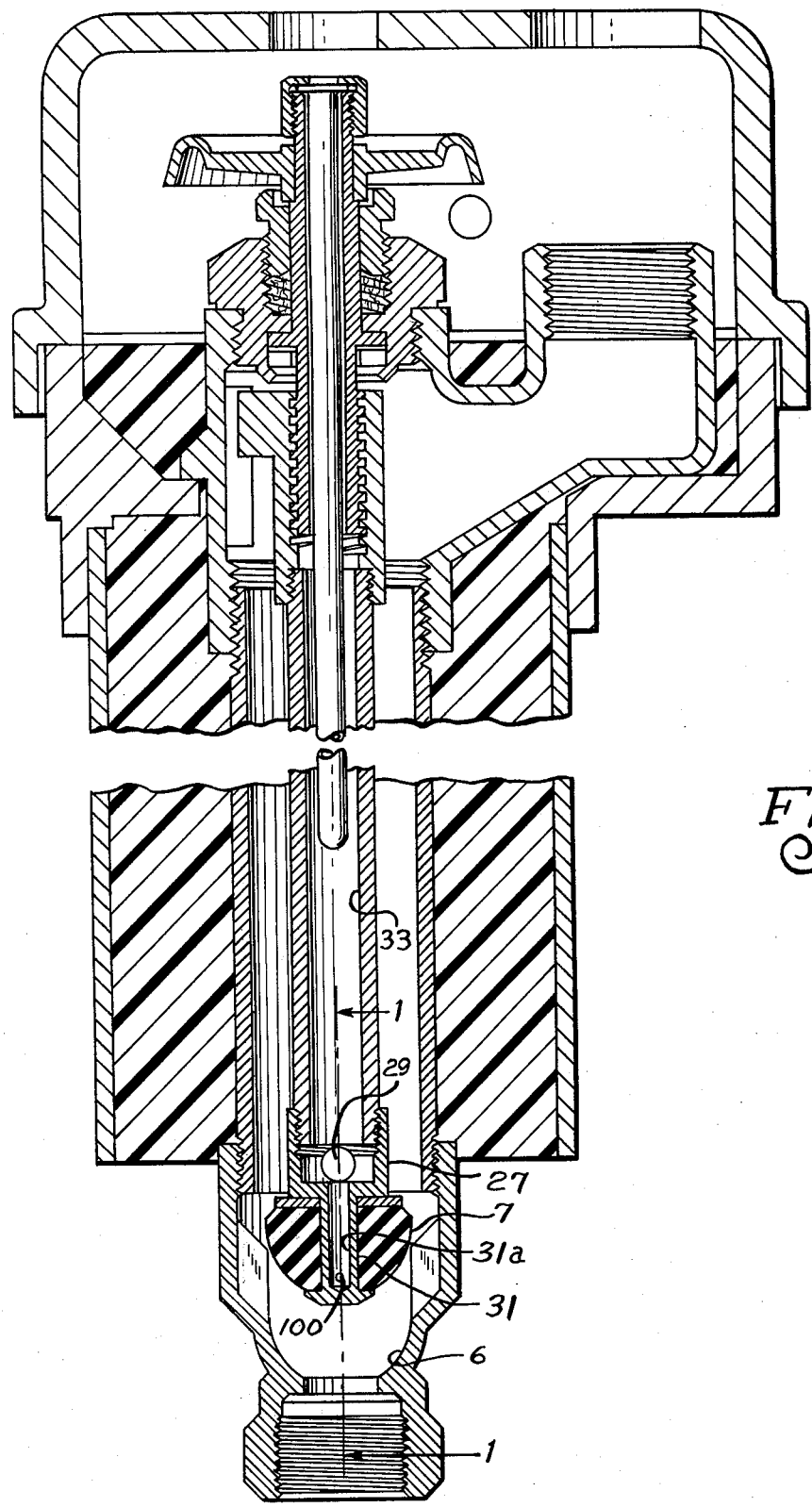
FIG. 8 is a side schematic illustration of another embodiment of the fluid connector apparatus of the present invention.

Referring now to FIG. 8 there is illustrated still another embodiment of the fluid connector apparatus of the invention. The embodiment shown in FIG. 8 is similar to the embodiment illustrated and described with reference to FIGS. 1 and 2. The operation and function of the embodiment of FIG. 8 is nearly identical to that of the foregoing embodiment of FIG. 1. The significant difference between the embodiment of FIG. 1 and the embodiment of FIG. 8 lies in a modification of valve 7 to achieve an additional improved result.

Valve 7 and support element 27 are similar to the elements described in FIG. 1 with the exception that the elongated solid projection shown in FIG. 1 has been modified to have a hollow interior flow passage 31a. Flow passage 31a is in fluid communication with passage 33 and the fluid passage through conduit 2 by means of blow hole 29. Hollow passage 31a extends downward to a position near the bottom of valve element 7 wherein a small hole 100 is provided through projection 31 in the valve element in communication with passage 31a. Hole 100 can be of any selected small size such as, for example, .06 inches and is adapted to provide a one-way leakage path from passage 31a and the interior of the housing connector downward through the leakage hole. Such a leakage path permits pressure to be relieved from within the housing caused by freezing or any other condition tending to raise the pressure when the valve 7 is in a closed position adjacent valve seat 6.

It is well known that water expands upon freezing. The classic example being the two bottles filled with water and set in freezing conditions. One bottle being capped and the other being left open. The capped bottle will crack, while the uncapped bottle will show a column of ice pushed up to the lip thereof or in fact beyond. The leakage structure herein disclosed performs substantially the same function.

Figure 9:
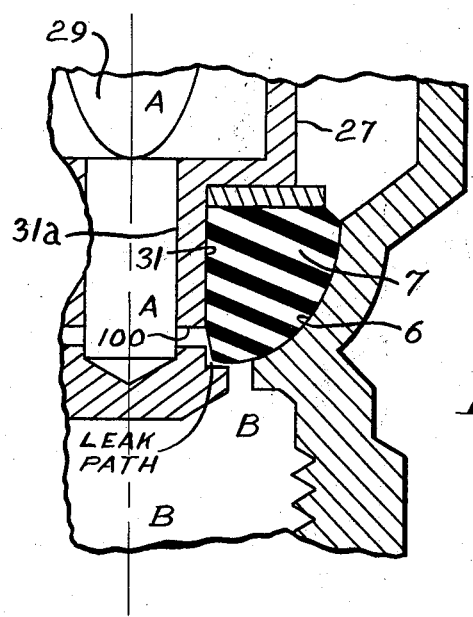
FIG. 9 is a section view taken along the line 1—1 of FIG. 8, showing the leak path when the pressure in the hollow interior flow passage is greater than the pressure in the inlet area.
Figure 10:
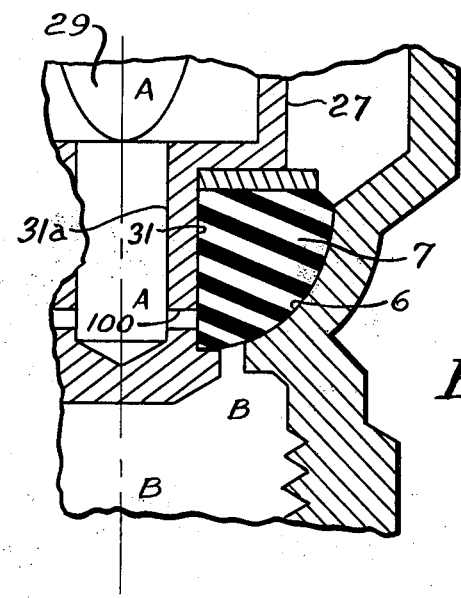
FIG. 10 is a view similar to FIG. 9, showing no leak path when the pressure in the inlet area is greater than the pressure in the hollow interior flow passage.

In operation, as best seen in FIG. 9 the hole 100 is opened causing a leak path due to the deformation of the valve element 7 adjacent the hole 100 only when the pressure in the hollow interior flow passage 31a (area A) is greater than the pressure in the inlet (area B). In FIG. 10, no leak path appears when the pressure in the inlet (area B) is greater than the pressure in the flow passage 31a since the valve element 7 is forced against the projection 31 closing the hole 100.

While the invention has been described with reference to preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A fluid connector for coupling an underground source of fluid to an above-ground surface utilization point comprising:

conduit means including a housing having an inlet, an outlet and a flow passage therebetween;

said inlet adapted to be attached to an underground source of fluid and said outlet providing an egress adjacent the ground surfaces and adapted to be coupled in fluid communication to a utilization station;

fluid control means including a fluid means including a fluid control element disposed within said conduit means to provide control of the fluid flow through the flow passage of said conduit means;

said fluid control means including an elongated member for supporting the fluid control element adjacent the inlet and extending through at least a portion of the flow passage to a position adjacent the top of the housing;

heating means positioned adjacent the elongated member within the flow passage, said heating means and said fluid control means being disposed in co-axial alignment to facilitate withdrawal thereof from said conduit means; and said heating means including an elongated heating element extending along said elongated member terminating above said fluid control element whereby heat is supplied to the flow passage above said fluid control element.

2. The fluid connector of claim 1 wherein said housing includes an opening in substantial axial alignment with the flow passage and positioned adjacent the ground surface for removably receiving the fluid control means.

3. The fluid connector of claim 2 wherein said opening further receives the heating means.

4. The fluid connector of claim 1 further comprising a fluid removal conduit extending within said flow passage and having an egress adjacent the ground surface whereby accumulated fluid within the flow passage is selectively removable.

5. The fluid connector of claim 1 further comprising a fluid removal line having one end in fluid communication with said flow passage and extending exterior thereof to provide an egress adjacent the ground surface at the opposite end of the removal line to selectively remove accumulated fluid.

6. The fluid connector of claim 1 further comprising insulative means attached in surrounding relationship to at least part of the exterior surface of the conduit means to provide thermal insulation.

7. The fluid connector of claim 1 wherein the fluid control element is positioned at a position adjacent said inlet whereby the fluid control element is located at an underground position below the frost line.

8. A fluid connector for coupling an underground source of fluid to an above-ground surface utilization point comprising:

conduit means including a housing having an inlet, and outlet and a flow passage therebetween;

said inlet adapted to be attached to an underground source of fluid and said outlet providing an egress adjacent the ground surfaces and adapted to be coupled in fluid communication to a utilization station;

fluid control means including a fluid control element disposed within said conduit means to provide control of the fluid flow through the flow passage of said conduit means;

said fluid control means including an elongated member for supporting the fluid control element adjacent the inlet and extending through at least a portion of the flow passage to a position adjacent the top of the housing, said elongated member consisting of a hollow tube;

heating means positioned within the hollow tube; and said heating means including an elongated heating element extending along said elongated member terminating above said fluid control element whereby heat is supplied to the flow passage above said fluid control element.

9. The fluid connector of claim 8 wherein said tube includes an opening providing fluid communication between the flow passage and the interior of the hollow tube to allow selective removal of accumulated fluid in the housing.

10. The fluid connector of claim 8 wherein said tube, said heating means and said control means are disposed in axial alignment to facilitate the simultaneous withdrawal thereof from the conduit means.

11. A fluid connector for coupling an underground source of fluid to an above-ground surface utilization point comprising:

conduit means including a housing having an inlet, an outlet and a flow passage therebetween;

said inlet adapted to be attached to an underground source of fluid and said outlet providing an egress adjacent the ground surfaces and adapted to be coupled in fluid communication to a utilization station;

fluid control means including a fluid control element disposed within said conduit means to provide control of the fluid flow through the flow passage of said conduit means;

said fluid control means including an elongated member for supporting the fluid control element adjacent the inlet and extending through at least a portion of the flow passage to a position adjacent the top of the housing;

heating means positioned adjacent the elongated member within the flow passage;

pressure relief means disposed in fluid communication with said conduit means, said pressure relief means including a leakage passage through the fluid control element; and said heating means including an elongated heating element extending along said elongated member terminating above said fluid control element whereby heat is supplied to the flow passage above said fluid control element.

* * * * *